VARIABLE ATTENUATION CORRECTING ELECTRIC IMPEDANCE NETWORK

Filed May 15, 1952 3 Sheets-Sheet 1

INVENTOR
BENGT JONAS TIMOTEUS CARLESON
BY Fredrik E. Hane
ATTORNEY

INVENTOR
BENGT JONAS TIMOTEUS CARLESON
BY Frederick E. Hane
ATTORNEY

INVENTOR
BENGT JONAS TIMOTEUS CARLESON
BY [signature]
ATTORNEY

United States Patent Office 2,758,281

Patented Aug. 7, 1956

2,758,281

VARIABLE ATTENUATION CORRECTING ELECTRIC IMPEDANCE NETWORK

Bengt Jonas Timoteus Carleson, Stockholm, Sweden, assignor to Telefonaktiebolaget L M Ericsson, Stockholm, Sweden, a company of Sweden Application May 15, 1952, Serial No. 287,960

Claims priority, application Sweden May 21, 1951

2 Claims. (Cl. 333—16)

This invention relates to an electric variable impedance network, especially intended for correcting the attenuation in multichannel carrier frequency transmission systems for telephony.

In long distance carrier frequency systems amplifiers have to be inserted at certain positions along the line because of the attenuation of the line. Because the line attenuation is different for different frequencies the amplification of these amplifiers has to be made dependent of the frequency. On open wire lines the attenuation of higher frequencies (above 10 kc./s.) will increase about linearly with the frequency, but the attenuation will also vary considerably with the weather, so that when the weather is wet or there is hoar-frost the attenuation curve will rise more rapidly. In order to compensate for this, the frequency response of the amplifiers must also be made variable.

The regulation of the amplification of the amplifiers of the equipment will usually be automatically made by the help of two pilot frequencies of a constant output level, one at each side of the transmitted frequency band. One of the pilot frequencies is usually used to regulate the amplification so that the gain will be changed uniformly for all frequencies (so called parallel regulation) while the other pilot frequency is used to vary the gain of the amplifier with frequency (so called slope regulation). In order that the parallel regulation and the slope regulation may be performed independently of each other, the slope regulation ought to be arranged so that by a change of the slope, the amplification at the pilot frequency, which controls parallel regulation, will remain substantially unchanged.

The invention will be described in the following in connection with the accompanying drawing, in which Fig. 1 shows a diagram of the regulation of the amplification in a carrier frequency transmission system;

Figure 1:
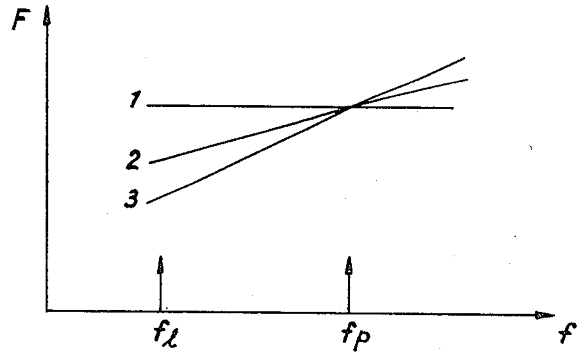

Fig. 1 of the drawing shows the amplification F as a function of the frequency $f$ in a carrier frequency system. In the figure the pilot frequency for parallel regulation is indicated by $f_p$ and the pilot frequency of the slope regulation by $f_1$. The line indicated by 1 relates to a certain parallel regulation, while the lines indicated by 2 and 3 show different slope regulations at that value of the parallel regulation. According to what has been mentioned above the amplification at the pilot frequency $f_p$ is constant for the parallel regulation, while the amplification at all other frequencies will vary with varying slope regulations. The slope regulation may evidently be said to mean, that the amplification line indicated by 1 is caused to rotate round the point, corresponding to the frequency $f_p$.

The slope regulation is usually obtained by varying a resistance in an impedance network and may be obtained in many different manners. One way is to cause the pilot frequency to actuate a potentiometer by the help of relays and servo motors, thus a mechanical regulation device. The most usual way now is to cause the pilot frequency to regulate the heating of a thermistor, the resistance of which is changed with the temperature.

Devices, previously known, for attenuation control of carrier frequency transmission systems have a serious disadvantage. In such prior systems, if the slope regulation network is adjusted to an extreme position as in the case of failure of the pilot frequency, feedback oscillation or overloading may occur in the amplifiers. In order to prevent this, special, complicated devices must often be used in the regulation system. The use of thermistors in the regulation device has on the other hand the disadvantage that their cooling takes a longer time than their heating, causing the regulation to be slower in one direction than in the other direction.

This invention intends to remedy these disadvantages by the use of two thermistors in an impedance network for regulation purposes. The temperature of the thermistors and thereby their resistance may be regulated in response to the pilot frequency by a device with non linear components in such a manner that, when the level of the pilot frequency e. g. increases, the resistance of one thermistor will decrease and the resistance of the other thermistor will increase or vice versa. Thereby the slope of the correction curve will be changed and this will occur equally fast in one direction as in the other direction because when one thermistor is heated, the other will be cooled, and vice versa.

The regulation device may be made so that if the pilot frequency totally disappears the two thermistors will be adjusted to the same resistance. In such a case the correction curve will be caused to have an average or normal slope, which is independent of the absolute value of the resistances of the thermistors.

Figure 2:
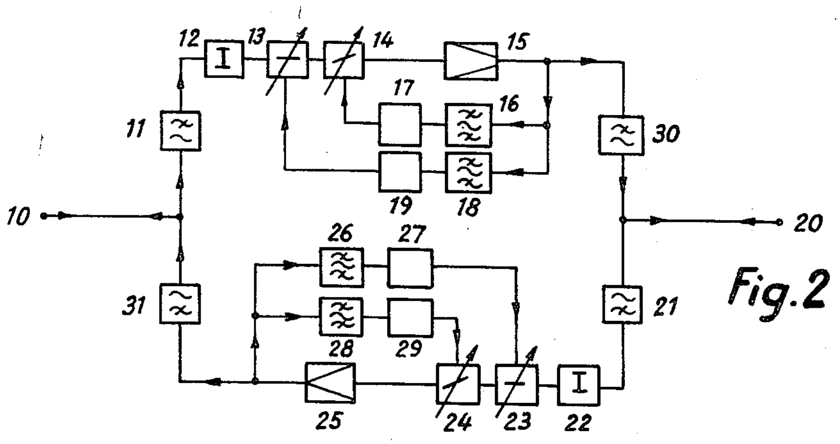
Fig. 2 shows a block diagram of a repeater amplifier embodying the system of Fig. 1.

In Fig. 2 there is shown a block diagram of a repeater amplifier in a twelve channel system intended for carrier frequency transmission on open wire lines and provided with attenuation correcting devices according to the invention.

As appears from the figure the repeater amplifier comprises devices for transmission of calls in both directions, the transmission direction from the terminal 10 to the terminal 20 comprising a series branch with the devices 11—15 and 30 and the other direction a series branch with the devices 21—25 and 31.

Signals arriving at the terminal 10 are applied to a low pass filter 11 intended for the frequency range 35–84 kc./s., which frequency range is applied to the part of the repeater amplifier utilized for the call direction 10—20. The device 12 is a non-variable attenuation network and the devices 13 and 14 are the level regulating devices, which comprise firstly a regulation amplifier and secondly an attenuation correcting network, the device 13 being the parallel regulation device and the device 14 the slope regulation device. From the said devices the signal currents are transmitted to an output amplifier 15 and to a low pass filter 30 for the frequency range 35–84 kc./s. and further to the terminal 20.

For the second series branch of the repeater amplifier, i. e. for the transmission in the direction 20—10, there are corresponding devices and in this case the carrier frequency is transmitted from the terminal 20, through the high pass filter 21 (frequency range 92–143 kc./s.), the non-variable network 22, the level regulating devices 23 and 24 (for parallel and slope regulation), respectively, the output amplifier 25 and the high pass filter 31 (frequency range 92–143 kc./s.) to the terminal 10.

To the output amplifier 15 two shunt branches are connected comprising partly the devices 16 and 17 partly the devices 18 and 19, said amplifier thus being fed back to the level regulation devices 13 and 14. The output amplifier 25 is connected in a similar manner, said amplifier having a feed back to the level regulation devices 23 and 24 through shunt branches comprising the devices 26, 27 and 28, 29, respectively.

In the following only the feedback branch belonging to the transmission direction 10—20 will be described, because the construction and the function of both branches are completely analogous.

From the output amplifier 15, the auxiliary or pilot frequencies, are taken out and used for level regulation. The pilot frequency of 84 kc./s. is applied to the parallel regulation device 13 through a crystal filter 18, which frequency is utilized in said device to obtain the level regulation previously described in connection with Fig. 1, said level regulation being equal for all frequencies.

From the output amplifier 15 a second pilot frequency 35 kc./s. is further taken out by the aid of the crystal filter 16, which has a very narrow pass band. The pilot frequency is then applied to the slope regulation device 14 through a pilot frequency receiver 17. The pilot frequency receiver 17, which is no part of the invention and e. g. consists of a magnetic amplifier device or an electron tube device, is arranged in such a manner, that the pilot frequency applied from the filter 16 will give rise to two regulation currents the sum of which being constant in the actual regulation range, and which currents are applied to the device 14 through different current ways. These regulation currents will vary in opposite directions to each other, when the incoming pilot frequency is changed. The pilot frequency receiver is further arranged so that when the pilot voltage entirely disappears the two said regulation currents will be equal to zero. The construction of the pilot frequency receiver will not be further described, but the slope regulation device 14 will be described more completely.

The device 14 comprises partly an amplifier and partly an impedance network, the attenuation of which is varied as a function of the two regulation currents applied from the pilot frequency receiver 17.

In order to regulate the amplification of said amplifier, the impedance network according to the invention may be connected in a feed back branch for negative feed back of the amplifier or it may also be connected in series with the amplifier tube of said amplifier.

Figure 3:
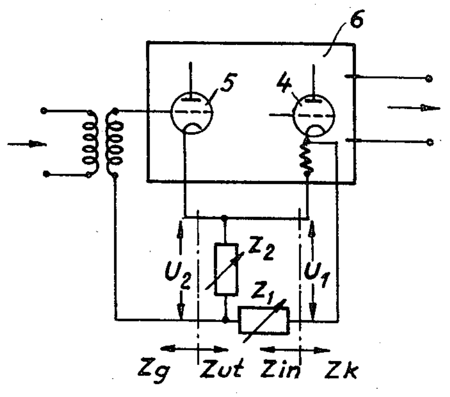
Figs. 3 and 4 show elementary diagrams of attenuation correcting networks according to the invention.

The network, which is schematically shown in Fig. 3, is formed as a voltage divider with two variable impedances $Z_1$ and $Z_2$ and may e. g. be connected between the cathode of the last tube 4 and the grid of the first tube 5 in the amplifier 6, as is schematically indicated by Fig. 3.

If the input impedance $Z_g$ of the amplifier is much greater than the output impedance $Z_{ut}$ of the attenuating network and the input impedance $Z_{in}$ of the network is much greater than the "cathode impedance" $Z_k$ of the amplifier 6 and the amplification without feed back is great, then the amplification will be proportional to the feed back attenuation.

$$\frac{U_1}{U_2} \approx 1+\frac{Z_1}{Z_2} \qquad (1)$$

In Equation (1) $U_1$ and $U_2$ indicate the input and output voltages respectively of the feed back network.

The impedances $Z_1$ and $Z_2$ consist of the input impedance of each of the two four-terminal networks $F_1$ and $F_2$. These four-terminal networks are each terminated by its thermistor resistor $R_1$ and $R_2$ respectively as is shown by the Figure 4, where the feed back network is shown less schematically than in Fig. 3. The four-terminal networks are characterized by the image impedances $Z'_{01}$, $Z''_{01}$ and $Z'_{02}$, $Z''_{02}$ respectively and by the complex image attenuation $\Gamma_1$ respectively $\Gamma_2$. The thermistor resistances are included in the thermistors 7 and 8, which are the devices in the attenuation correcting network, to which the two pilot currents obtained from the pilot frequency receiver 17 are applied.

The impedances $Z_1$ and $Z_2$ may be obtained from the following formulas:

$$\left.\begin{aligned} Z_1 &= Z'_{01}\frac{\frac{R_1}{Z''_{01}}+\tanh \Gamma_1}{1+\frac{R_1}{Z''_{01}}\tanh \Gamma_1} \\ Z_2 &= Z'_{02}\frac{\frac{R_2}{Z''_{02}}+\tanh \Gamma_2}{1+\frac{R_2}{Z''_{02}}\tanh \Gamma_2} \end{aligned}\right\} \qquad (2)$$

If we introduce the definition $$\theta=\alpha+j\beta=ln\frac{U_1}{U_2}=ln\left(1+\frac{Z_1}{Z_2}\right)$$

we will obtain $$e^{\theta}=1+\frac{Z_1}{Z_2}=1+\frac{Z'_{01}}{Z'_{02}}\cdot\frac{\frac{R_1}{Z''_{01}}+\tanh \Gamma_1}{1+\frac{R_1}{Z''_{01}}\tanh \Gamma_1}:\frac{\frac{R_2}{Z''_{02}}+\tanh \Gamma_2}{1+\frac{R_2}{Z''_{02}}\tanh \Gamma_2} \qquad (3)$$

I of the resistances $R_1$ and $R_2$ may get the values $$\left.\begin{aligned} R_1&=Z''_{01} \\ R_2&=Z''_{02} \\ e^{\theta}=e^{\theta_0}&=1+\frac{Z'_{01}}{Z'_{02}} \end{aligned}\right\} \qquad (4)$$

we will obtain

If $Z'_{01}$ and $Z'_{02}$ are constant and not dependent on the frequency, then we will obtain a constant and frequency independent attenuation $$\theta_0=ln\left(1+\frac{Z'_{01}}{Z'_{02}}\right)$$

or $$\frac{Z'_{01}}{Z'_{02}}=e^{\theta_0}-1$$

The four-terminal networks may suitably be constructed to have the same complex image attenuation $$\Gamma_1=\Gamma_2=\Gamma$$

Then the Equation 3 will be as follows $$e^{\theta}=1+(e^{\theta_0}-1)\cdot\frac{\frac{R_1}{Z''_{01}}+\tanh \Gamma}{1+\frac{R_1}{Z''_{01}}\tanh \Gamma}:\frac{\frac{R_2}{Z''_{02}}+\tanh \Gamma}{1+\frac{R_2}{Z''_{02}}\tanh \Gamma} \qquad (5)$$

If $$\left.\begin{aligned} \frac{R_1}{Z''_{01}}=\frac{R_2}{Z''_{02}} \text{ or } \frac{R_1}{R_2}=\frac{Z''_{01}}{Z''_{02}} \\ \theta=\theta_0 \end{aligned}\right\} \qquad (6)$$

we will obtain i. e. if the quotient between $R_1$ and $R_2$ is equal to the quotient between $Z''_{01}$ and $Z''_{02}$, the attenuation $\theta_0$ will still be obtained, independent of the absolute value of $R_1$ or $R_2$.

But if $R_1$ and $R_2$ may vary, so that $$\left.\begin{array}{l}\frac{R_1}{Z''_{01}}=\frac{Z''_{02}}{R_2}=y \\ \text{i. e.} \\ R_1 \cdot R_2 = Z''_{01} \cdot Z''_{02} \\ \text{we will obtain} \\ e^{\theta}=1+(e^{\theta_0}-1)\left[\frac{y+\tanh \Gamma}{1+y \tanh \Gamma}\right]^2\end{array}\right\} \quad (7)$$

i. e. if the product of $R_1$ and $R_2$ is constant and equal to the product of $Z''_{01}$ and $Z''_{02}$ a variation of the attenuation will be obtained, which depends upon y and the complex image attenuation $\Gamma$.

It is often advantageous in calculations instead of the impedance ratio $R_1/Z''_{01}$ and $R_2/Z''_{02}$ respectively to calculate with the reflection factors $$r_1=\frac{R_1-Z''_{01}}{R_1+Z''_{01}}$$

and $$r_2=\frac{R_2-Z''_{02}}{R_2+Z''_{02}}$$

respectively.

Then Equation 5 will take the following form:

$$e^{\theta}=1+(e^{\theta_0}-1)\frac{1+r_1e^{-2\Gamma}}{1-r_1e_{-2\Gamma}}\cdot\frac{1-r_2e^{-2\Gamma}}{1+r_2e_{-2\Gamma}} \quad (5a)$$

and Equation 7

$$\left.\begin{array}{l}e^{\theta}=1+(e^{\theta_0}-1)\left[\frac{1+re^{-2\Gamma}}{1-re_{-2\Gamma}}\right]^2 \\ \text{if} \\ r=r_1=-r_2\end{array}\right\} \quad (7a)$$

Usually only the real part of $\theta=\alpha+j\beta$ will be of any interest.

If the definition $\Gamma=A+jB$ is introduced the following expression of $\alpha$ will be obtained.

$$\alpha=ln\left|1+(e^{\theta_0}-1)\left[\frac{1+re^{-2(A+jB)}}{1-re^{-2(A+jB)}}\right]^2\right| \quad (8)$$

If we examine how $\alpha$ varies for different values of $r$ and B, it will be shown that for $B=\pm 45°$, $\alpha$ will be relatively independent of the value of $r$. In other words the amplification will be relatively independent of $R_1$ and $R_2$ for the frequency, where $B=\pm 45°$.

In order to obtain the wanted frequency dependence of $\alpha$ the four-terminal networks $F_1$ and $F_2$ may be constructed in many different manners. If $\theta_0$ shall be independent of the frequency, then $Z_{01}$ and $Z_{02}$ ought to be independent of the frequency. Such networks may e. g. be of the bridged T-type or lattice-type.

Figure 5:
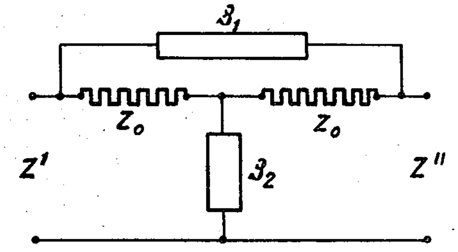
Fig. 5 shows a four-terminal network.

From the mathematical point of view one of the simplest types of four-terminal networks is a network of the bridged T-type according to Fig. 5.

If in such a network $z_1 \cdot z_2 = Z_0^2$ then $Z'=Z''=Z_0=$ constant and independent of the frequency.

If for the case of simplicity $z_1$ and $z_2$ are presumed to be entirely reactive, we will be allowed to set $$\left.\begin{array}{l}z_1=jx\cdot Z_0;\ z_2=\frac{Z_0}{jx} \\ \text{where } x \text{ is a real, frequency dependent variable.}\end{array}\right\} \quad (9)$$

Then we will obtain $$\left.\begin{array}{l}e^{\Gamma}=1+jx \\ \text{or} \\ e^{-2\Gamma}=\frac{1}{(1+jx)^2}\end{array}\right\} \quad (10)$$

If this is inserted in Equation 8 and if $\theta=\alpha_0$ we will obtain $$\alpha=ln\left|1+(e^{\alpha_0}-1)\left[\frac{(1+jx)^2+r}{(1+jx)^2-r}\right]^2\right| \quad (11)$$

Figure 6:
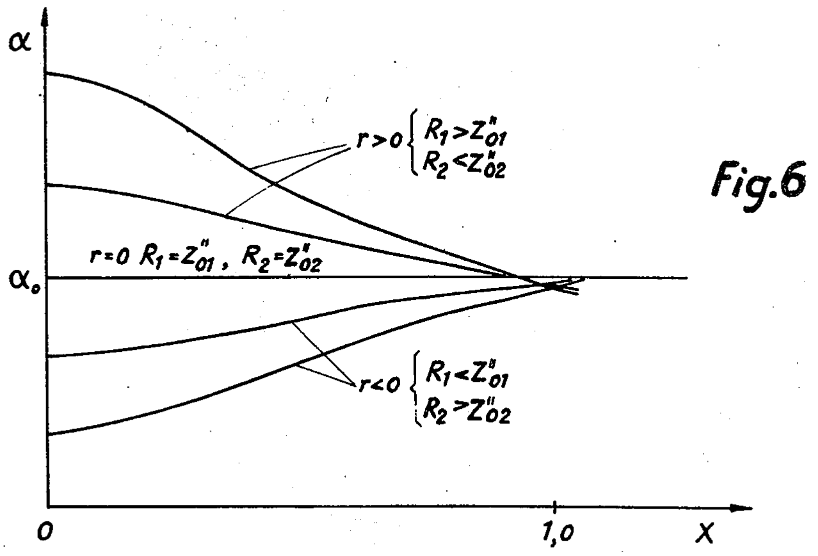
Fig. 6 shows an attenuation diagram.

The form of the curves $\alpha=f(x)$ for different values of $r$ is shown by Fig. 6. For $x=1$ the variation of $\alpha$ for different values of $r$ is generally less than 0.1 Neper, which usually has no importance. In the case of $R_1$ and $R_2$ not varying completely inversely, according to equation (7), i. e. $r_1 \neq r_2$, one may approximately set $$r=\frac{r_1-r_2}{2}$$

which will give approximately the right result in the most cases in practice.

In order to get $\alpha$ as a wanted function of the frequency the impedances $z_1$ and $z_2$ may afterwards be frequency transformed in the usual manner.

Figure 4:
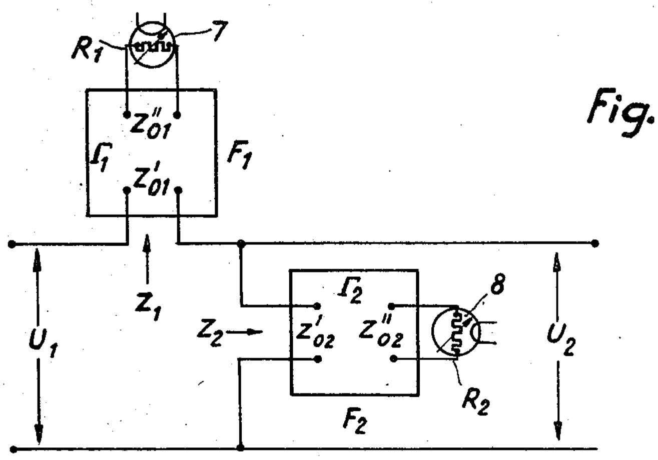

It is evident by the mathematical correlation above that with an impedance network according to the invention the attenuation of the network may be varied in accordance with the input level to the amplifier 15 (Fig. 2) according to the varying attenuation conditions of the transmission medium in the carrier frequency system and that this variation will have mainly the same velocity, when the level is regulated either up or down, since the thermistors are utilized so that one thermistor, e. g. 7 in Fig. 4, is heated, while the second thermistor 8 is cooled.

In previous arrangements for level regulation with thermistors these have, contrary to the invention, been connected so that the essential time difference in the cooling and heating of the thermistor for obtaining a certain increase or decrease of the resistance has resulted in different rates of response.

Further it is evident by the foregoing discussion that when the resistances of the two thermistors get very high (or low) values, the correction will be equal to the average correction $\theta_0$. This is of great advantage, when faults occur in other parts of a carrier frequency system causing the pilot frequency voltage to disappear and the thermistors to be cold.

In arrangements previously known the regulation network has in such a case been brought into an extreme position and complicated devices have been necessary to prevent this harmful condition.

Another advantage of using two thermistors is that maximum regulation may be obtained without modifying the resistance of each thermistor as much as by using only one thermistor.

Figure 7:
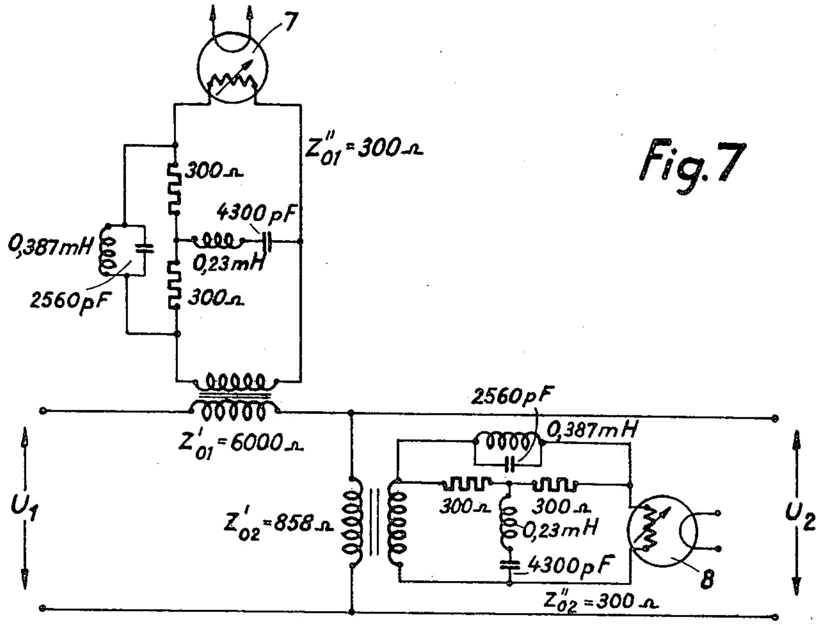
Fig. 7 shows an embodiment of a slope regulation network according to the invention.

An example of a network according to the invention and intended for the frequency band 35–84 kc./s. is shown in Fig. 7.

As in Figs. 3 and 4, $U_1$ and $U_2$ indicate the feedback voltage taken out and fed back respectively from the regulation amplifier. 7 and 8 indicate the two thermistors with their resistances $R_1$ respectively $R_2$. In order to be able to make the two four-terminal networks with their thermistors identically equal, two transformers are utilized so that they will have little or no influence on the attenuation constant $\Gamma$ of the four-terminal networks. The step up ratios of the transformers are chosen so that $\alpha_0=2.08$ Nepers.

Figure 8:
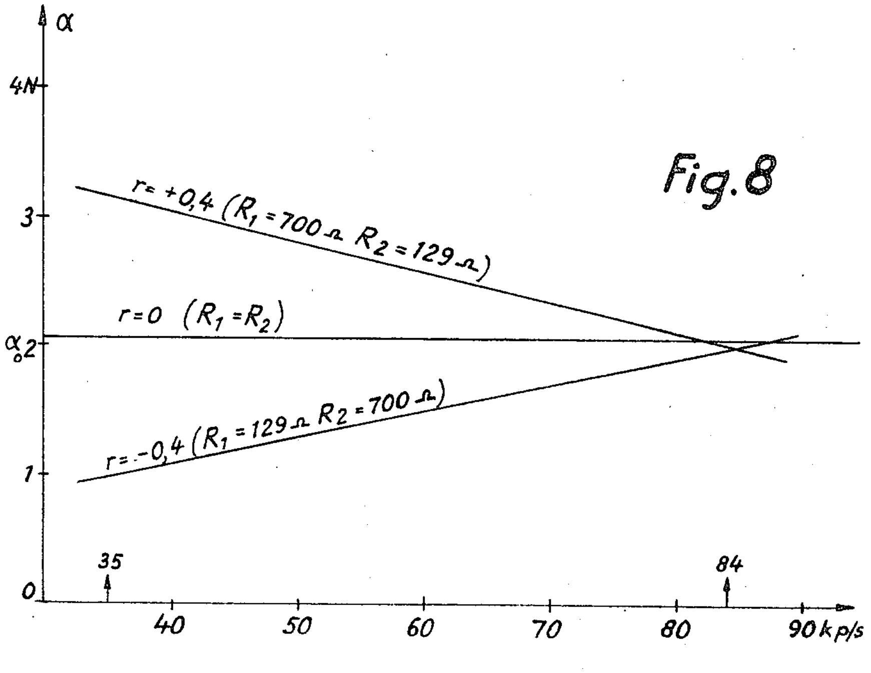
Fig. 8 shows a diagram of the function of this slope regulation network at different frequencies.

With the network shown in Fig. 7 a regulation curve according to Fig. 8 will be obtained, where the attenuation (the level)

$$\alpha=ln\left|\frac{U_1}{U_2}\right|$$

has been drawn as a function of the frequency in kc./s. In this case the pilot frequency is 35 kc./s., so that by slope regulation the attenuation curve will be rotated round the pilot frequency 84 kc./s. for the parallel regulation and the latter frequency is situated at the upper frequency limit. In the diagram the average attenuation $\alpha_0$ is shown together with the two maximum corrections, within which the network is intended to work, and the value of the reflexion factor $r$ and the corresponding values of $R_1$ and $R_2$ are also indicated. As is shown by the diagram the average correction $\alpha_0$ will always be obtained, if $R_1=R_2$, notwithstanding the absolute values of these resistors.

I claim:

1. Automatic level regulating means for connection to the transmission line of a multichannel carrier frequency system having a pilot signal comprising attenuation equalizing means including at least two networks each having an input and an output and equal complex image attenuation, the output of one of said networks being connected effectively in shunt with said line and the other of said networks being connected effectively in series with said line, individual impedance means shunting the input of each network, and means responsive to said pilot signal for varying the shunt impedances in opposite directions and in accordance with changes in magnitude of the pilot signal while maintaining the product of said impedances substantially equal to the product of the image impedances of said networks and to cause the attenutation of the attenuation equalizing means to vary over a range including a value corresponding to normal line conditions, the last said means being arranged to operate in the absence of the pilot signal to modify said shunt impedances to produce said value corresponding to normal line condition.

2. Automatic regulating means according to claim 1 wherein said shunt impedances are thermistors and the last said responsive means comprise current generating means and heating means associated with said thermistors and responsive to said current generating means.

References Cited in the file of this patent

UNITED STATES PATENTS

| | | |
|---|---|---|
| 2,153,743 | Darlington | Apr. 11, 1939 |
| 2,331,530 | Zinn | Oct. 12, 1943 |
| 2,550,595 | Pfleger | Apr. 24, 1951 |